United States Patent [19]

Tanaka et al.

[11] 4,058,100

[45] Nov. 15, 1977

[54] INTAKE AIR FLOW RATE MEASURING DEVICE FOR INTERNAL COMBUSTION ENGINE

[75] Inventors: Eizi Tanaka, Anjo; Hiroshi Mochizuki, Okazaki, both of Japan

[73] Assignee: Nippon Soken, Inc., Nishio, Japan

[21] Appl. No.: 665,443

[22] Filed: Mar. 9, 1976

[30] Foreign Application Priority Data

Mar. 14, 1975 Japan .................................. 50-31359

[51] Int. Cl.² ............................................ F02M 69/00
[52] U.S. Cl. ...................... 123/139 AW; 123/139 BG; 261/50 A; 261/52
[58] Field of Search ................................ 261/50 A, 52; 123/139 AW, 139 BG

[56] References Cited

U.S. PATENT DOCUMENTS

| | | | |
|---|---|---|---|
| 3,103,211 | 9/1963 | Cameron | 123/139 AW |
| 3,628,515 | 12/1971 | Knapp et al. | 261/50 A |
| 3,650,258 | 3/1972 | Jackson | 123/139 AW |
| 3,680,535 | 8/1972 | Eckert et al. | 261/50 A |
| 3,739,762 | 6/1973 | Jackson | 123/139 AW |
| 3,777,727 | 12/1973 | Kirchner et al. | 261/50 A |
| 3,929,114 | 12/1975 | Schmidt et al. | 261/50 A |
| 3,934,561 | 1/1976 | Romann et al. | 123/139 AW |
| 3,953,548 | 4/1976 | Jaggle et al. | 261/50 A |
| 3,963,005 | 6/1976 | Eckert | 261/50 A |

*Primary Examiner*—Tim R. Miles
*Attorney, Agent, or Firm*—Cushman, Darby & Cushman

[57] ABSTRACT

A flow rate measuring device for an internal combustion engine with an unbalanced sensing vane pivotably disposed in an intake pipe upstream of a throttle valve, an actuating device having a pressure chamber and a movable diaphragm coupled to the sensing vane for actuating the same in response to a pressure applied to the pressure chamber, and a conduit communicating the pressure chamber with the intake pipe between the sensing vane and the throttle valve. The flow rate measuring device further has a pressure difference responsive valve responsive to a pressure difference across the sensing vane to compensate the pressure applied to the pressure chamber, whereby the pressure difference across the sensing vane can be kept constant irrespective of changes in the amount of intake air.

15 Claims, 3 Drawing Figures

4,058,100

INTAKE AIR FLOW RATE MEASURING DEVICE FOR INTERNAL COMBUSTION ENGINE

BACKGROUND OF THE INVENTION

The present invention relates generally to a device for measuring the flow rate of intake air flowing into an internal combustion engine, and more particularly a device for measuring the flow rate of intake air flowing into the engine by detecting the degree of opening of a sensing vane disposed within an air intake pipe at the upstream of a throttle valve.

In the devices of the type described above, which have the sensing vane of a butterfly type, the angular displacement of the vane is not in linear proportion to the area of the opening defined between the vane and the inner wall of the air intake pipe, and it is not guaranteed that the pressure difference across the sensing vane will be maintained constant. As a result, the flow rate of intake air is not in linear proportion to the angular displacement of the sensing vane. Therefore when the conventional devices are incorporated in the fuel injection systems of internal combustion engines, the signal representative of the degree of opening of the sensing vane must be so processed as to be in linear relation with the flow rate of intake air because the quantity of fuel to be injected into the cylinders must be metered depending upon the flow rate of intake air so as to provide a predetermined air-fuel ratio. In correcting the signal, not only the area of the opening defined between the sensing vane and the inner wall of the air intake pipe but also the pressure difference across the sensing vane must be taken into consideration. The signal must be corrected based upon the data obtained from the experiments. Therefore the air-fuel ratio cannot be controlled with a desired degree of accuracy. In addition, the conventional devices are complex in construction because various devices must be incorporated in order to correct the signal.

SUMMARY OF THE INVENTION

In view of the above, one of the objects of the present invention is to provide a flow rate measuring device for intake air into an internal combustion engine in which the angular displacement of a sensing vane is precisely in linear proportion to the flow rate of intake air.

In order to make the angular displacement of the sensing vane in precisely linear proportion to the flow rate of intake air, the pressure difference across the vane must be maintained constant regardless of the angular displacement of the sensing vane. For this purpose the flow rate measuring device in accordance with the present invention includes means for detecting the pressure difference across the sensing vane and producing the pressure signal representative of the difference between the detected pressure difference and a reference pressure difference, and means responsive to said pressure signal for controlling the angular displacement of the sensing vane in such a way that the pressure difference across the vane may become equal to the reference pressure difference.

In order to attain the more precise linear proportionality between the angular displacement of the sensing vane and the flow rate of intake air, a curved recess is formed in the inner wall of the air intake pipe at the portion in opposed relation with the path of the lower side edge of the sensing vane during its angular displacement so that the area of the opening defined by the sensing vane and the inner wall of the air intake pipe may be precisely in linear proportion to the angular displacement of the vane.

According to the present invention, the degree of opening of the sensing vane is in precisely linear proportion to the flow rate of intake air. Therefore when the sensing vane is operatively coupled to a fuel metering system, fuel may be metered precisely in proportion to the flow rate of intake air and consequently the optimum air-fuel mixture of a predetermined air-fuel ratio may be charged into the cylinders so that not only the fuel saving may be attained but also the favorable exhaust emission control may be attained.

Another object of the present invention is to provide an flow rate measuring device in which the degree of opening of the sensing vane may be automatically controlled in response to the load on the engine so that the optimum richer fuel-air mixture may be provided under high and/or low load condition of the engine.

To this end, the present invention provides means for automatically changing the reference pressure difference depending upon the load on the engine.

The above and other objects, features and advantages of the present invention will become more apparent from the description of some preferred embodiments thereof taken in conjunction with the accompanying drawing.

BRIEF DESCRIPTION OF THE DRAWING

Same reference numerals are used to designate similar parts throughout the figures.

DESCRIPTION OF THE PREFERRED EMBODIMENTS

Figure 1:
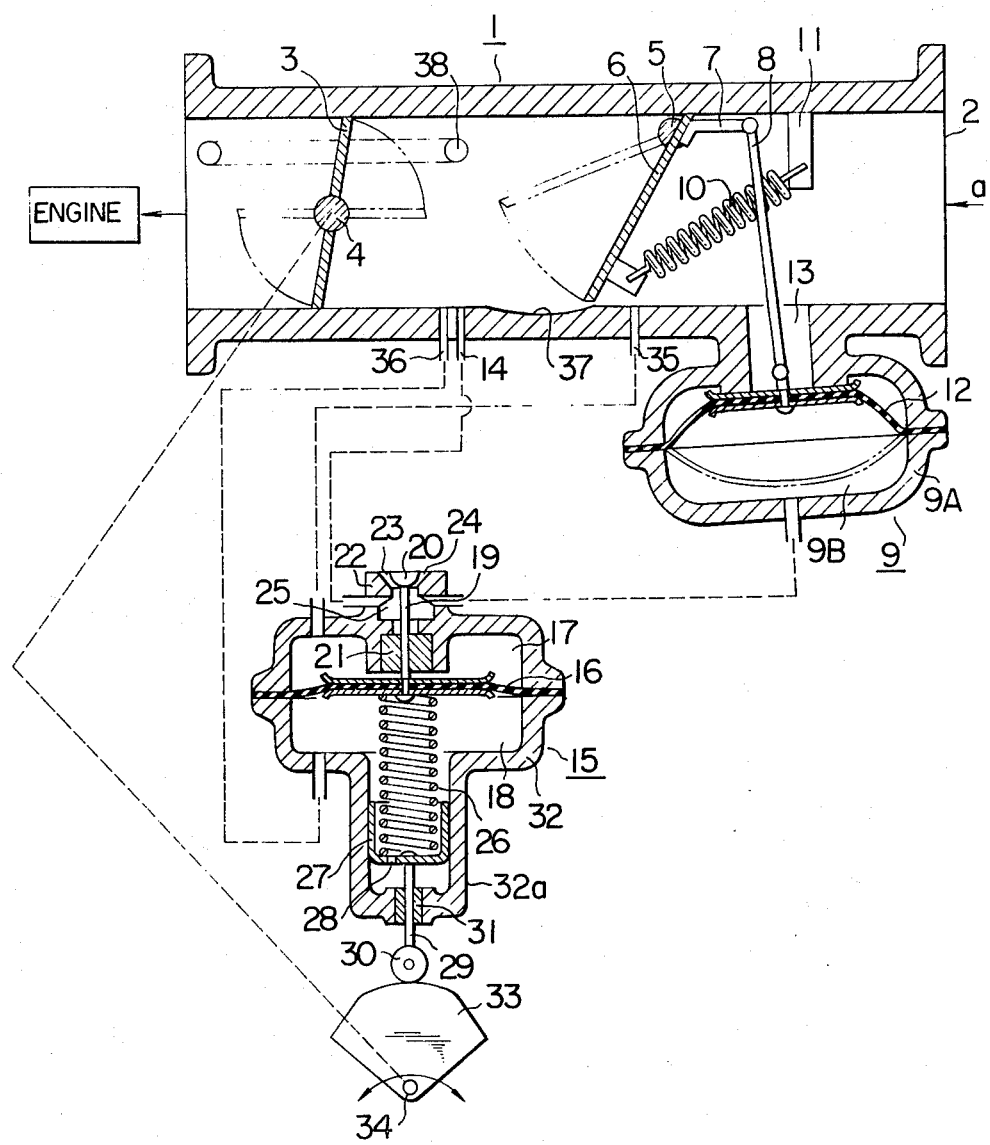
FIGS. 1, 2 and 3 are sectional views of first, second and third embodiments, respectively, of a flow rate measuring device for intake air in accordance with the present invention.

First Embodiment, FIG. 1

In FIG. 1 there is shown a first embodiment of a flow rate measuring system for intake air in accordance with the present invention. An air cleaner (not shown) is communicated through an air intake pipe 1 rectangular in cross section with an internal combustion engine so that the intake air flows through the air intake pipe 1 in the direction indicated by the arrow *a* from the entrance 2 thereof. A throttle valve 3 is carried by a shaft 4 which in turn is rotatably supported in the air intake pipe 1 and is operatively coupled to an accelerator pedal (not shown) so that the opening degree of the throttle valve 3 may be suitably controlled depending upon the operating conditions of the engine.

A rectangular sensing vane 6 is carried at its upper side by a shaft 5 which in turn is rotatably supported in the air intake pipe 1 at the upstream of the throttle valve 3 and is operatively coupled to a conventional metering system to control the flow rate of the fuel supplied into the engine in response to the angular displacement thereof. The upper side of the sensing vane 6 has an arm 7 fixed thereto and operatively coupled through a connecting rod 8 to a diaphragm 12 in pressure-responsive actuating means or diaphragm box 9. A return spring 10 is loaded between the lower side of the sensing vane 6 and a support 11 attached to the air intake pipe 1 to attract the sensing vane 6 to its closed position.

The diaphragm 12 divides the space defined by a housing 9A into an upper pressure chamber communicated with an upstream pressure tap 13 formed in the air intake pipe 1 upstream of the vane 6 and a lower pressure chamber 9B communicated through a negative pressure control chamber 25 in a pressure difference responsive or diaphragm valve 15 with a downstream pressure tap 14 formed in the air intake pipe 1 downstream of the vane 6. The diaphragm 12 may be deformed by the pressure difference between the upper and lower pressure chambers to rotate the sensing vane 6 through the connecting rod 8 and the arm 7.

The diaphragm valve 15 comprises an upper case 22, a lower case 32 and a diaphragm 16 whose peripheral edge is sandwiched between the upper and lower cases 22 and 32 to define a first or upper pressure chamber 17 and a second or lower pressure chamber 18. The lower end of a valve shaft 19 is securely fixed to the center of the diaphragm 16 while the upper end is terminated into a semispherical valve element 20 adapted to seat on a valve seat 23 formed on the top wall of the upper case 22. The valve shaft 19 is slidably yet air-tightly fitted into a valve shaft guide 21. The negative pressure control chamber 25 is communicated with the surrounding atmosphere through a variable-area air flow passage 24 defined between the valve element 20 and its valve seat 23. A return spring 26 is disposed within the second pressure chamber 18 between the diaphragm 16 and a spring shoe 27 in the form of a piston with an air hole 28 drilled through the bottom thereof. The piston-shaped spring shoe 27 is slidably fitted into the cylinder section 32a of the lower case 32, and is connected to the upper end of a rod 29 which is slidably yet air-tightly fitted into a rod guide 31 fitted into the bottom of the cylinder section 32a of the lower case 32. A roller 30 is rotatably attached to the lower end of the rod 29, and is made into contact with a plate cam 33 carried by a cam shaft 34 which in turn is operatively interlocked with the shaft 4 of the throttle valve 3.

The first pressure chamber 17 of the diaphragm valve 15 is communicated with an upstream pressure tap 35 formed in the pipe 1 upstream of the vane 6 while the second pressure chamber 18 is communicated with a downstream pressure tap 36 formed downstream of the vane 6.

Within the air intake pipe 1 a curved recess 37 is formed on the inner wall at the area facing to the lower side edge of the vane 6 so that the opening area defined between the lower side edge of the vane 6 and the curved recess 37 may be in linear proportion with the opening degree of the vane 6, i.e., the angular displacement of the shaft 5. An entrance 38 of a bypass passage is opened into the air intake pipe 1 in order that a suitable rate of intake air may flow into the engine through the bypass passage, thereby ensuring the stable idling of the engine with the throttle valve 3 completely closed.

Next the mode of operation of the first embodiment with the above construction will be described hereinafter. When the engine is started and the throttle valve 3 is opened, the intake air flows into the air intake pipe 1 from its entrance 2 in the direction $a$ so that the sensing vane 6 is rotated depending upon the intake air flow rate against the force of the return spring 10. The negative pressure at the downstream of the sensing vane 6 is more negative than the negative pressure at the upstream of the sensing vane 6 because of the pressure loss due to the presence of the sensing vane 6. The upstream negative pressure is transmitted through the upstream pressure tap 13 to the upper chamber of the diaphragm box 9 and through the upstream pressure tap 35 to the first pressure chamber 17 in the diaphragm valve 15. The negative pressure at the downstream of the sensing vane 6 is transmitted through the downstream pressure tap 36 to the second pressure chamber 18 in the diaphragm valve 15 and through the downstream pressure tap 14 and the negative pressure control chamber 25 in the diaphragm valve 15 to the lower pressure chamber 9B in the diaphragm box 9. The sensing vane 6 is held in the position where the force exerted thereto from the air flow plus the force exerted thereto from the diaphragm 12 through the connecting rod 8 and the arm 7 are in equilibrium with the force of the return spring 10. Let us consider the pressure difference across the sensing vane 6 in the equilibrium position. With the negative pressure at the upstream of the sensing vane 6 and the negative pressure at the downstream thereof designated as P1 and P2, respectively, the pressure difference is expressed in the following equation:

$$\Delta P = P1 - P2.$$

Then the area of the variable-area air passage 24 defined between the valve element 20 and its valve seat 23 is designated as A. For the sake of explanation, when the pressure difference is equivalent to the reference pressure difference designated as $\Delta Po$, the area of the variable-area air passage 24 is assumed to be equivalent to an area designated as $Ao$.

I. $\Delta P = \Delta Po$:

Under this condition, the pressure difference across the diaphragm 16 in the diaphragm valve 15 is $\Delta Po$, and the area of the air passage 24 is held at $Ao$ by definition. Since the negative pressure control chamber 25 is communicated through the air passage 24 with the area $Ao$ with the surrounding atmosphere, the downstream pressure (negative pressure) which acts on the lower surface of the diaphragm 12 in the diaphragm box 9 is reduced to P'20. Under these conditions, the rotational torque in the clockwise direction of the vane 6 due to the forces exerted not only from the diaphragm box 9 but also from the air flow is in equilibrium with the rotational torque due to the force of the return spring 10. Then the pressure difference across the sensing vane 6 equals $\Delta Po$.

II. $\Delta P < \Delta Po$:

When the pressure difference $\Delta P$ becomes lower than the reference pressure difference $\Delta Po$, the force acting on the diaphragm 16 to attract the same downward decreases so that the diaphragm 16 deflects itself upward under the force of the spring 26, and consequently the valve element 20 is further displaced upwardly of the valve seat 23. As a result, the area A of the air passage 24 becomes larger than $Ao$ so that the negative pressure acting upon the lower surface of the diaphragm 12 in the diaphragm box 9 is more reduced. Consequently the diaphragm 12 is deflected upward and the sensing vane 6 is rotated in its closing direction by the force of the return spring 10. Then the pressure loss is increased, and consequently the pressure difference across the vane 6 increases up to the reference pressure $\Delta Po$. When the pressure difference $\Delta P$ reaches the reference pressure $\Delta Po$, the equilibrium is attained.

III. $\Delta P > \Delta Po$:

This is the condition opposite to that of (II) so that the sensing vane 6 is rotated in its opening direction as will be readily understood. Therefore the pressure loss due to the presence of the vane 6 is decreased, and consequently the pressure difference ΔP decreases up to the reference pressure difference ΔPo. When ΔP = ΔPo, the equilibrium is attained.

Therefore the pressure difference ΔP across the sensing vane 6 may be maintained in a stable manner within a predetermined permissible tolerance of the reference pressure difference ΔPo over the whole range of intake air flow rate. (This is true even in case of the idling because the intake air flows through the bypass passage into the engine as described elsewhere.) In addition, the degree of opening defined by the lower side of the sensing vane 6 and the curved recess 37 of the air intake pipe 1 is in linear proportion to the angular displacement of the sensing vane 6 as described above. Consequently the flow rate of intake air passing through the opening defined by the sensing vane 6 is in linear proportion to the angular displacement of the vane 6.

Next the mode of operation of the first embodiment which is incorporated in a fuel injection system in order to control the air-fuel ratio depending upon the operating conditions of the engine will be described. In general, a rich air-fuel ratio is required in case of the idling or low load condition and the high load condition of the engine with the lower and higher degree of opening of the throttle valve respectively, whereas a lean air-fuel ratio is required in a medium load condition of the engine with the intermediate degree of opening of the throttle valve in order to save the fuel and to minimize the pollutants in the exhaust gases. Therefore according to the present invention, the cam surface of the plate cam 33 consists of a low-, medium- and high-load sections with the distances between these three sections and the axis of the cam shaft 34 made different from each other. Since the cam shaft 34 is operatively interlocked with the shaft 4 of the throttle valve 3, the position of the roller 30 in contact with the cam 33 and hence of the spring shoe 27 is dependent upon the angular displacement of the throttle valve shaft 4 and hence the degree of opening of the throttle valve 3. For the sake of explanation, it is assumed that with the reference pressure difference ΔPo, the reference area Ao of the air passage 24 and a medium load, the piston-shaped spring shoe 27 be in the reference position Lo and the resulting air-fuel ratio be (A/F)o, which is the reference air-fuel ratio. When the degree of opening of the throttle valve 3 changes from medium to wide; that is, when the load on the engine is increased, the cam 33 which is interlocked with the shaft 4 of the throttle valve 3, is rotated so that the high-load cam surface section is made into contact with the cam follower or roller 30, and consequently the roller 30 and hence the spring shoe 27 are lowered. As a result the set position (and hence the load set to the return spring 26) of the return spring 26 is lowered so that the returning force produced by the spring 26 is decreased. Therefore with the reference pressure difference ΔPo, the valve shaft 19 is lowered and consequently the area A of the air passage 24 is reduced so that the diaphragm box 9 causes the sensing vane 6 to open wider. The equilibrium is attained with the higher degree of opening of the vane 6 and the pressure difference ΔP lower than the reference pressure difference ΔPo. Consequently, the flow rate of intake air passing through the opening defined by the sensing vane 6 decreases because of the small pressure difference even when the opening is increased. The shaft 5 of the sensing vane 6 is operatively coupled to fuel metering means such that the quantity of fuel metered may be in proportion to the angular displacement of the shaft 5. As a result, the resulting air-fuel ratio A/F becomes richer than the reference air-fuel ratio (A/F)o even with the same opening degree of the sensing vane 6. That is, the air-fuel ratio becomes richer with the high load than with the medium load. Under the low load condition, the mode of operation is substantially similar to that described above.

Since the air hole 28 is drilled through the bottom of the spring shoe 27, there is no difference between the negative pressures acting upon the upper and lower surfaces of the bottom of the spring shoe 27.

As described above, according to the present invention the angular displacement of the shaft 5 of the sensing vane 6 is in linear proportion to the intake air flow rate. When the rich air-fuel ratio is required, the pressure difference ΔP across the sensing vane 6 is reduced while the degree of opening of the vane 6 remains unchanged so that the flow rate of intake air is decreased. Since the degree of opening of the sensing vane 6 and hence the angular displacement of the shaft 5 thereof remain unchanged, the quantity of fuel to be metered and injected remains unchanged. As a result, the air-fuel ratio A/F becomes richer than the reference air-fuel ratio (A/F)o. The present invention may be therefore applied to the fuel injection systems in which the angular displacement of the sensing vane 6 and hence the shaft 5 thereof may be detected mechanically or electrically.

Figure 2:
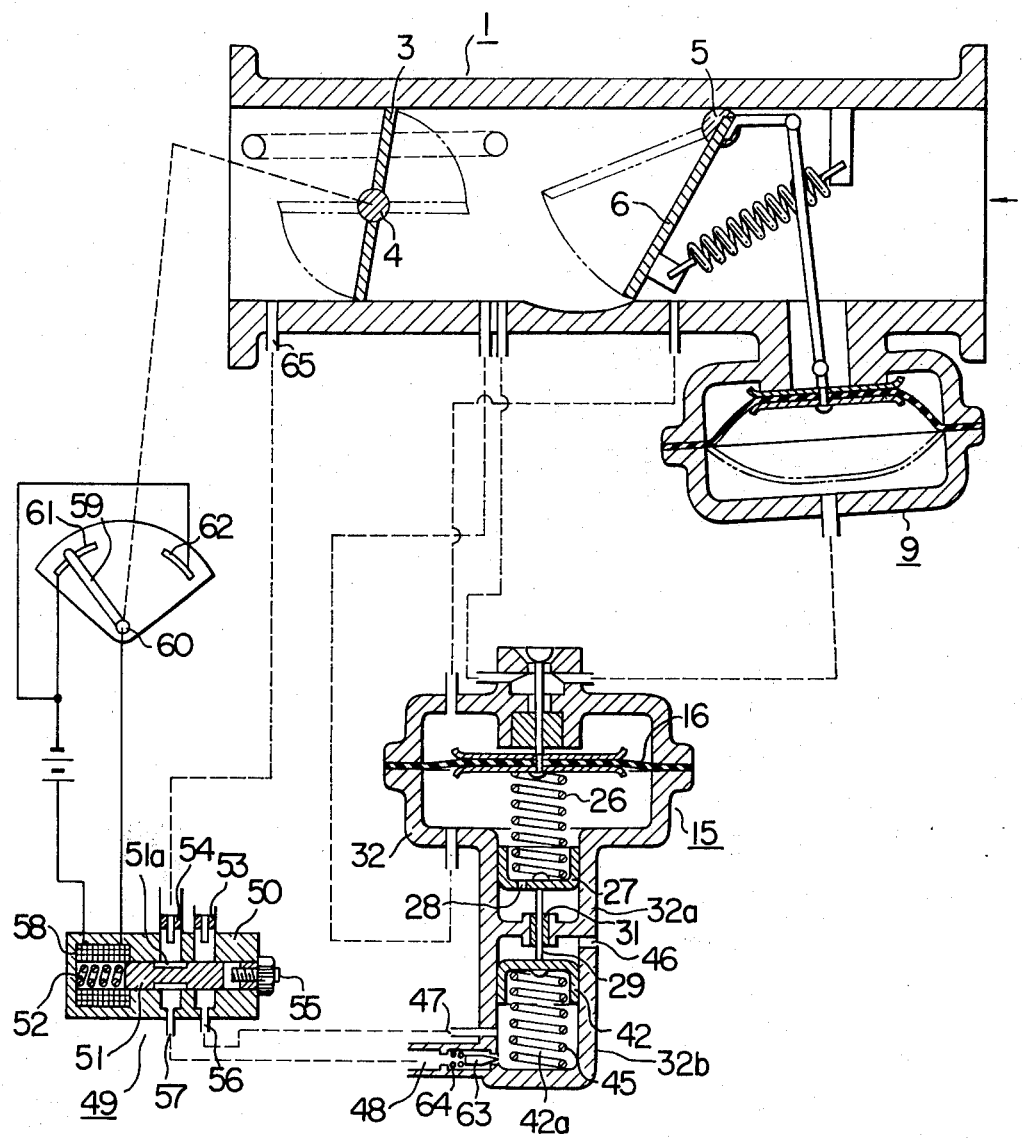

Second Embodiment, FIG. 2

The second embodiment shown in FIG. 2 is substantially similar in construction to the first embodiment described above with reference to FIG. 1 except that means for detecting the degree of opening of the throttle valve is different from that of the latter. In FIG. 2, the lower casing 32 of the diaphragm valve 15 has a lower cylindrical section 32b formed immediately below, coaxially of and integral with the upper cylindrical section 32a into which is slidably fitted the spring shoe 27. Within the lower cylindrical section 32b is slidably fitted a piston 42 joined to the lower end of the rod 29. The chamber within the lower cylindrical section 32b is divided into an upper chamber and a lower chamber 42a by the piston 42, the upper chamber being communicated through a vent hole 46 with the surrounding atmosphere while the lower chamber 42a being communicated with an air inlet port 47 and a negative pressure inlet port 48. A return spring 45 is loaded in the lower chamber 42a between the piston 42 and the bottom of the lower cylinder section 32b to force the piston 42 upward.

A pressure selector valve generally indicated by 49 for selecting the pressure signal to be transmitted into the lower chamber 42a, comprises a case 50, a piston plunger 51 slidably fitted within the casing 50 and having an annular groove 51a at the periphery thereof, a return spring 52 for forcing the plunger 51 rightward in the drawing, a first nozzle 53 communicated with the surrounding atmosphere, a second nozzle 54 formed in the casing 50 and communicated with a pressure tap 65 which is formed in the air intake pipe 1 downstream of the throttle valve 3, an adjusting screw 55 screwed on the casing 50 for adjusting the position of the plunger 51, first and second outlet ports 56 and 57 formed in the casing 50 and communicated with the air inlet port 47 and negative pressure inlet port 48, respectively, of the diaphragm valve 15, and an electromagnet coil or solenoid 58 for sliding the plunger 51.

An arm or movable contact 59 is carried by a shaft 60 operatively coupled to the shaft 4 of the throttle valve 3 and is selectively made into contact with either a low- or high-load stationary contact 61 or 62. The movable contact arm 59 is electrically connected to one terminal of the solenoid 52 while the stationary contacts 61 and 62 are electrically connected through a power supply to the other terminal of the solenoid 58.

At the negative pressure inlet port 48 is disposed a check valve 63 loaded with a return spring 64.

Next the mode of operation of the second embodiment with the above construction will be described hereinafter. With a medium load the movable contact arm 59 is made into contact with neither the stationary contact 61 or 62 so that the solenoid 58 remains de-energized and the piston 51 is pushed to right under the force of the return spring 52 to such position where the annular groove 51a of the piston 51 establishes the intercommunication between the first nozzle 53 and the first outlet port 56. As a result, the atmospheric air flows through the inlet port 47 into the lower chamber 42a in the diaphragm valve 15 so that the piston 42 is lifted under the force of the return spring 45. Under this condition, the pressure difference ΔP across the sensing vane 6 equals the reference pressure difference ΔPo with the resulting air-fuel ratio equal to the reference air-fuel ratio (A/F)o. With the increase in load, the movable contact arm 59 is made into contact with the high-load stationary contact 62 so that the solenoid 58 is energized, attracting the plunger 51 to left. As a result, the plunger 51 is displaced to such position where the annular groove 51a thereof establishes the intercommunication between the second nozzle 54 communicated with the pressure tap 65 and the second outlet port 57 as shown in FIG. 2. As a result, the negative pressure at the downstream of the throttle valve 3 flows through the selector valve 49 and the check valve 63 into the lower chamber 42a to act on the piston 42 so that the piston 42 is lowered against the return spring 45 thereby to lower the spring shoe 27 therewith. The check valve 63 keeps the piston chamber 42a closed even when the negative pressure transmitted from the downstream of the throttle valve 3 drops below the negative pressure already transmitted into the piston chamber 42a so that the piston 42 may be maintained in the lowered position. Under these conditions, the pressure difference across the sensing vane 6 becomes lower than the reference pressure difference ΔPo with the resulting increase in the air-fuel ratio richer than the reference air-fuel ratio (A/F)o. The mode of operation in case of the idling or a low load is substantially similar to that described above.

Figure 3:
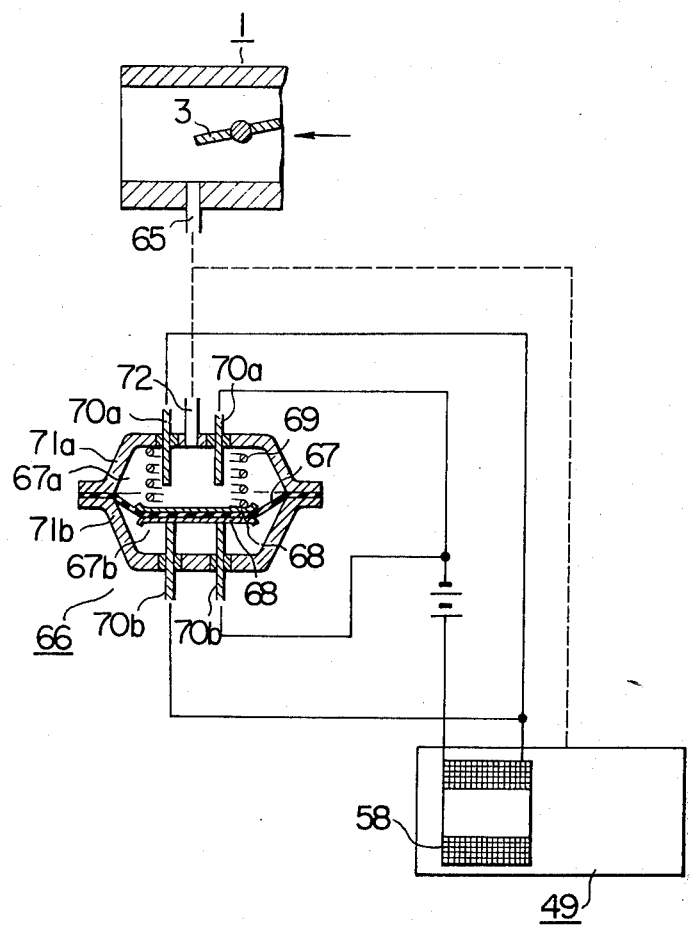

Third Embodiment, FIG. 3

The third embodiment shown in FIG. 3 is substantially similar in construction to the second embodiment described above with reference to FIG. 2. In the second embodiment, the solenoid 58 of the selector valve 49 is controlled by the movable contact arm 59 carried by the shaft 60 operatively coupled to the shaft 4 of the throttle valve 3 so that the energization and de-energization of the solenoid 58 dependent upon the angular displacement of the throttle valve 3. In the third embodiment, the energization and de-energization of the solenoid 58 is controlled by a negative pressure sensor 66 adapted to sense the change in load on the engine.

The negative pressure sensor 66 comprises an upper and lower cases 71a and 71b coupled together, a diaphragm 67 whose peripheral edge is sandwiched between the upper and lower cases 71a and 71b and which divides the space within the sensor 66 into an upper pressure chamber 67a and a lower pressure chamber 67b, a spring shoe 68 attached to the diaphragm 67, a return spring 69 loaded in the upper pressure chamber 67a between the upper casing 71a and the spring shoe 68, an upper pair of contact rods 70a extended by a predetermined length through the top of the upper case 71a into the upper pressure chamber 67a, a lower pair of contact rods 70b extended by a predetermined length through the bottom of the lower case 71b into the lower pressure chamber 67b, and an inlet port 72 for communicating the upper pressure chamber 67a with the pressure tap 65 of the air intake pipe 1. One of the upper contact rods 70a and one of the lower contact rods 70b are electrically connected to the negative terminal of the power supply while the other contact rods 70a and 70b are connected to one terminal of the solenoid 58 the other terminal of which is connected to the positive terminal of the power supply. The force of the return spring 69 is so selected that with a medium load on the engine the diaphragm 67 may be located between the upper and lower electrodes 70a and 70b and consequently the spring shoe 68 attached to the diaphragm 67 is out of contact with them. Therefore, with a medium load on the engine, the solenoid 58 of the selector valve 49 remains de-energized. With a high load on engine, the negative pressure which is transmitted to the upper pressure chamber 67a increases so that the diaphragm 67 is deflected upward against the return spring 69 and consequently the spring shoe 68 is made into contact with the upper contact rods 70a. As a result, the solenoid 58 is energized. On the other hand, when the load on the engine is low, the diaphragm 67 is deflected downward so that the spring shoe 68 is made into contact with the lower contact rods 70b. As a result, the solenoid 58 is also energized. Except the above control of the energization and de-energization of the solenoid 58 by the negative pressure sensor, the mode of operation of the third embodiment is substantially similar to that of the second embodiment.

What is claimed is:

1. A flow rate measuring device for intake air into internal combustion engines of the type provided with an air intake pipe (1) and a throttle valve (3) disposed within said air intake pipe (1) for controlling the flow rate of intake air flowing into the engine, said device comprising:

a. an unbalanced sensing vane (60 pivoted to said air intake pipe (1) at the upstream of said throttle valve (3), said sensing vane being opened or closed in response to the flow rate of intake air flowing into said air intake pipe (1), b. a shaft (5) operatively coupled to and rotated by said sensing vane (6), the angular displacement of said shaft representing the flow rate of intake air, c. a pressure-difference-responsive valve (15) comprising:
  a housing (32),
  a flexible member (16) extended through said housing (32) to define therein a first pressure chamber (17) and a second pressure chamber (18),
  said first and second pressure chambers being so communicated with said air intake pipe that the air pressures at the upstream and downstream of said sensing vane (6) may be transmitted to said first and second pressure chambers, respectively, valve means (19, 20, 23) attached to said flexible member (16), and communicated with both the atmosphere and said intake pipe (1) between said sensing vane and said throttle valve, and spring means (26) so loaded as to normally bias said flexible member (16) toward said first pressure chamber, whereby in response to both the pressure produced in said intake pipe between said sensing vane and throttle valve and the pressure difference between a pressure in said intake pipe upstream of said sensing vane and a pressure in said intake pipe downstream of said sensing vane, said pressure-difference-responsive valve producing a pressure signal, and d. pressure-responsive actuating means (9) comprising:

a housing (9A), a flexible member (12) extended through said housing to define in said housing a pressure chamber (9B) into which is transmitted said pressure signal from said pressure-difference-responsive valve (15), and connecting means (7, 8) for operatively interconnecting between said flexible member (12) and said sensing vane (6), whereby in response to said pressure signal said flexible member being deflected and the deflection thereof being transmitted through said connecting means to said sensing vane (6), thereby controlling said pressure difference at a constant value.

2. A flow rate measuring device as set forth in claim 1 wherein a recess (37) is formed in the inner wall of said air intake pipe (1) at the area facing to the forward edge of said sensing vane (6) opposite to the edge thereof pivoted to said intake pipe (1), the profile of said recess being so determined that the intake air passage defined by said sensing vane and the inner wall of said intake pipe may be in linear proportion to the angular displacement of said sensing vane.

3. A flow rate measuring device as set forth in claim 2 further comprising spring load adjusting means operatively coupled to said spring means (26) in said pressure-difference-responsive valve (15) in such a way that the force of said spring means (26) exerted to said flexible member (16) may be varied in response to the operating conditions of the engine.

4. A flow rate measuring device as set forth in claim 3 wherein said spring load adjusting means comprises a spring shoe (27) slidably fitted into said housing (32) of said pressure-difference-responsive valve (15) for receiving one end of said spring means (26), means for detecting a high and/or low load condition of the engine to produce a signal, and means responsive to the signal from said detecting means representative of the high and/or low load condition of the engine for causing the displacement of said spring shoe, thereby changing the load on said spring means, whereby with the high and/or low load on the engine said pressure-difference-responsive valve (15) changes the level of the pressure signal so that said pressure-responsive actuating means (9) displaces said sensing vane (6) in such a direction in which the pressure difference across said sensing vane (6) may be reduced.

5. A flow rate measuring device as set forth in claim 4 wherein said spring-load adjusting means comprises a. a connecting rod (29) one end of which is securely fixed to said spring shoe (27), b. a roller (30) rotatably attached to the other end of said connecting rod means, and c. cam means (33) operatively coupled to said throttle valve (3) in said air intake pipe (1) for coacting with said roller (30) so as to displace said spring shoe (27) in the axial direction of said spring means (26), whereby with the high and low loads on the engine, said spring shoe (27) may be displaced in a direction in which the load exerted to said spring means may be reduced.

6. A flow rate measuring device as set forth in claim 4 wherein said spring-load adjusting means comprises a. a piston (42) slidably fitted into a chamber (42a) formed in said pressure-difference-responsive valve (15) and operatively connected to said spring shoe (27), b. second spring means (45) loaded in said chamber for normally holding said piston in the neutral position, c. inlet means (48) for introducing working fluid into said chamber (42a), thereby displacing said piston (42) against said second spring means in such a direction in which said spring shoe (40) is displaced so as to reduce the load of said first spring means (26), d. outlet means (47) for discharging said working fluid out of said chamber (42a), e. a selector valve (49) for selectively opening one of said inlet and outlet means while closing the other, and f. selector valve control means responsive to the load condition of the engine for controlling said selector valve so as to open said inlet means (48) only when the engine is under high and low load conditions.

7. A flow rate measuring device as set forth in claim 6 wherein said selector valve is of the solenoid controlled type and adapted to open said inlet means (48) when energized and to open said outlet means (47) when de-energized, and said selector valve control means comprises a rotary switch (59, 60, 61, 62) having a movable contact carried by a shaft operatively coupled to said throttle valve (3) in said air intake pipe (1), and high- and low-load stationary contacts (61, 62), whereby with the high or low load on the engine, said movable contact is made into contact with said high- or low-load stationary contact, thereby closing a circuit of said solenoid controlled selector valve (49) to energize the same.

8. A flow rate measuring device as set forth in claim 6 wherein said selector valve is of the solenoid control type and adapted to open said inlet means (48) when energized and to open said outlet means (47) when de-energized, and said selector valve control means comprises a. a housing, b. a diaphragm (67) disposed within said housing to divide said housing into a first pressure chamber (67a) and a second pressure chamber (67b), c. a spring shoe (68) made of an electrically conductive material and attached to said diaphragm, d. a first pair of contact rods (70a) extended in parallel by a predetermined length into said first pressure chamber and electrically connected to the terminals, respectively, of said solenoid operated selector valve (49), e. a second pair of contact rods (70b) extended in parallel by a predetermined length into said second pressure chamber and electrically connected to the terminals, respectively, of said solenoid-operated selector valve (49), f. an inlet opened into said first pressure chamber (67a) and communicated with said air intake pipe (1) for transmitting the negative pressure therein into said first pressure chamber, and g. spring means (69) loaded in said first pressure chamber between said spring shoe (68) and said housing, the force of said spring means (69) being so selected that with the high or low load, said diaphragm is deflected toward said first or second pressure chamber and consequently said spring shoe means (68) is made to contact with said first pair of contact rods (70a) or second pair of contact rods (70b), thereby energizing said solenoid-controlled selector valve (49), and with the medium load on said engine said diaphragm is held in the position intermediate between said first and second pairs of contact rods and consequently said spring shoe means is out of contact with both said first and second pairs of contact rods, thereby de-energizing said solenoid-operated selector valve.

9. A flow rate measuring device as set forth in claim 4 wherein said detecting means is adapted to detect the negative pressure at the downstream of said throttle valve (3) in said air intake pipe (1).

10. A flow rate measuring device for intake air into internal combustion engines of the type provided with an air intake pipe (1) and a throttle valve (3) disposed within said air intake pipe (1) for controlling the flow rate of intake air flowing into the engine, said device comprising:

a. an unbalanced sensing vane (6) disposed within said intake pipe (1) at the upstream of said throttle valve (3), said sensing vane being opened or closed in response to the flow rate of intake air flowing into said air intake pipe (1), b. a shaft (5) operatively coupled to and rotated by said sensing vane, the angular displacement of said shaft representing the flow rate of intake air, c. means (15) for detecting the pressure difference across said sensing vane (6) and producing a signal representative of both the difference between the detected pressure difference across said sensing vane and a pressure in said intake pipe between said sensing vane and said throttle valve, and d. means (9) responsive to said signal for controlling the degree of opening of said sensing vane (6) such that the pressure difference across said sensing vane is controlled at a constant value, whereby the degree of opening of said sensing vane is precisely in proportion to the flow rate of intake air.

11. A flow rate measuring device for intake air into internal combustion engines of the type having an intake pipe through which air is introduced into an engine, and a throttle valve disposed in said intake pipe for controlling the flow rate of intake air flowing therethrough, said flow rate measuring device comprising:

a. an unbalanced sensing vane pivotally disposed in said intake pipe upstream of said throttle valve;

b. pressure responsive actuating means having a pressure chamber, a movable member operable in response to a pressure introduced into said pressure chamber, and connecting means for operatively interconnecting said movable member with said sensing vane, said actuating means actuating said sensing vane to open and close in response to the pressure introduced into said pressure chamber;

c. conduit means communicating said pressure chamber with said intake pipe between said sensing vane and said throttle valve to thereby introduce a pressure produced in said intake pipe between said sensing vane and said throttle valve into said pressure chamber; and d. pressure difference responsive means for supplying air into said pressure chamber in response to a pressure difference between a pressure in said intake pipe upstream of said sensing vane and a pressure in said intake pipe downstream of said sensing vane so as to actuate said sensing vane so that said pressure difference is kept constant.

12. A flow rate measuring device as set forth in claim 11 wherein said intake pipe has an inner wall with a recess formed in the inner wall at the area adjacent the forward edge of said sensing vane and opposite to the edge thereof pivoted to said intake pipe, the profile of said recess being so determined that the intake air passage defined by said sensing vane and the inner wall of said intake pipe may be in linear proportion to the angular displacement of said sensing vane.

13. A flow rate measuring device as set forth in claim 11, further comprising:

means for changing the constant value at which said pressure difference is controlled, in response to at least one of the operating conditions of said engine.

14. A flow rate measuring device as set forth in claim 13, wherein said constant value changing means responds to an opening degree of said throttle valve.

15. A flow rate measuring device as set forth in claim 13, wherein said constant value changing means responds to a negative pressure in said intake pipe downstream of said throttle valve.

* * * * *